United States Patent [19]

Sepp

[11] Patent Number: 4,978,221
[45] Date of Patent: Dec. 18, 1990

[54] LASER DISTANCE AND ALTITUDE MEASURING APPARATUS

[75] Inventor: Gunther Sepp, Ottobrunn, Fed. Rep. of Germany

[73] Assignee: Messerschmitt-Boelkow-Blohm GmbH, Munich, Fed. Rep. of Germany

[21] Appl. No.: 465,764

[22] Filed: Jan. 16, 1990

[30] Foreign Application Priority Data

Jan. 14, 1989 [DE] Fed. Rep. of Germany ....... 3901040

[51] Int. Cl.⁵ .............................................. G01S 17/87
[52] U.S. Cl. ......................................... 356/4; 244/3.17
[58] Field of Search ..................... 244/3.16, 3.17, 3.19; 342/62; 356/4, 5

[56] References Cited

U.S. PATENT DOCUMENTS

| | | | |
|---|---|---|---|
| 4,495,589 | 1/1985 | Hirzel | 356/ |
| 4,671,650 | 6/1987 | Hirzel et al. | 356/ |
| 4,709,142 | 11/1987 | Dahl | 356/5 X |
| 4,812,035 | 3/1989 | Freedman et al. | 356/5 |
| 4,847,481 | 7/1989 | Altmann | 356/ |

FOREIGN PATENT DOCUMENTS 3606337 8/1987 Fed. Rep. of Germany .

Primary Examiner—Thomas H. Tarcza
Assistant Examiner—Mark Hellner
Attorney, Agent, or Firm—W. G. Fasse; D. H. Kane, Jr.

[57] ABSTRACT

Two laser distance measuring functions are preformed on board of a ground-hugging cruise missile by at least one laser distance meter for taking downwardly directed altitude measurements and diagonally or slantedly forwardly directed distance measurements for producing corrected altitude signals for use in controlling the flight of the missile. Both types of measurements can be made by one laser distance meter that is tiltable in the required direction or two laser units are provided. The correction provides a clear recognition of artificial fog by evaluating both types of measured values in an intelligent signal processing unit which compares the intensities of the measured values from the same ground locations, determines the extinction coefficient of the fog and takes the angular distribution of the back-scattering intensity of the laser beams into consideration for correcting the altimeter readings.

12 Claims, 2 Drawing Sheets

LASER DISTANCE AND ALTITUDE MEASURING APPARATUS

FIELD OF THE INVENTION

The invention relates to an apparatus for measuring distance and altitude by means of respective laser devices carried on board of low flying missiles, such as cruise missiles.

BACKGROUND INFORMATION

It has been demonstrated, contrary to conventional wisdom, that laser distance measuring devices can be used as altimeters on board cruise missiles, for example, submunition missiles, dispensers, etc., with an absolutely adequate reliability, since laser beam damping will not be too great, even in poor weather and fog, taking into account the short distances to be measured in this context. Such laser distance measuring devices will be referred to herein as laser distance meters and laser altimeters. Such laser distance meters may also be used when the field of view is directed diagonally or at a slant in the forward and downward direction for the purpose of guiding a terrain-hugging flight with a constant flying altitude above the ground.

In planning a mission, it must always be taken into account that areas over which the missile must fly will be shielded with artificial fog. Visibilities in such artificial fog can sometimes be very short, in extreme cases, less than one meter over larger areas. If an area of terrain is covered with artificial fog, then the upper side or surface of the fog may appear to the laser distance meter, suggested here as a laser altimeter, as a ground surface located closer to the missile. This is so, even though the fog upper surface is only weakly remitting. As a result, the missile goes automatically into a climbing flight. The same effect can also be caused by natural fog when using the am/cw measuring method (amplitude modulation/ continuous wave with phase detection), but in a weaker form.

It is known, that the critical flight phase for cruise missiles, such as dispensers, is the final approach to the target in a terrain-hugging flight at an altitude of approximately 50 m. A laser altimeter suggested for the foregoing purpose has proven itself quite satisfactory, even in heavy, natural fog with a visibility down to about 50 m. In situations wherein the visibility in fog approaches the measurable or measuring distance, laser distance meters functioning according to the am/cw measuring method indicate an increasingly smaller distance than the actual distance with an increasing fog density. As a result, the missile would automatically go into a climbing flight. Therefore, it is necessary that the laser altimeter is capable of recognizing the fog for eliminating the fog's negative influence on the flight guidance. In this connection a method has been suggested which corrects the reduced measured distance with the aid of a known fog extinction coefficient. For obtaining such a coefficient for calibration of the system, measurements are taken of the fog, which is assumed to be constant in its effect throughout its expanse, in a direction from which the fog only, and not a target, reflects the laser beam. German Patent No. 3,606,337 (Sepp et al.), published on Aug. 20, 1987 describes a calibration method for continuous wave laser distance meters based on the just outlined considerations. Corresponding considerations apply to artificial fog, which often has extremely short visibilities, down to less than 1 m and fog layer thicknesses of only a few meters. The heavier the fog is concentrated on the ground, the less falsifying is its influence, with an otherwise constant overall extinction coefficient, on the distance measurement. Yet another method has been suggested for recognizing suddenly occurring artificial fog by reducing the receiving intensity and the distance modulation of the laser altimeter, in response to receiving decreasing distance measured values from the laser distance meter. Such an approach to solving the problem caused by fog can be referred to as a "smoothing" of the ground roughness by the fog, so that the inertial navigation is switched on. However, the above mentioned limitations and assumptions have room for further improvements for avoiding these limitations and assumptions.

OBJECTS OF THE INVENTION

In view of the foregoing it is the aim of the invention to achieve the following objects singly or in combination:

to equip cruise missiles, having, for a terrain-hugging flight, altimeters and distance meters in the form of laser distance meters operating according to the am/cw measuring method, so that natural and artificial fog can be clearly recognized and taken into account for a reliable, exact flight guidance free of errors;

to prevent natural and artificial fog from falsifying the distance and/or altitude measurements required for properly guiding a cruise missile, so as to eliminate the adverse effects of such fogs on the guiding of the missile; and to prevent fog of any kind from causing a cruise missile to increase its altitude above ground.

SUMMARY OF THE INVENTION

The distance and altitude measuring apparatus according to the invention is characterized by the combination of a downwardly looking laser altimeter and an obliquely forwardly viewing laser distance meter. The altimeter and the distance meter from two laser units are constructed as am/cw semiconductor laser devices. The output signals, including reception intensity signals and measured distance signals, of both laser units are supplied to a common signal processor for a synchronized correlation of the measured values from both units to determine the flying speed above the ground. The respective signal is corrected by comparing the intensities of measured values from the same ground locations as measured by both distance meters. The correction takes into account the angular dependence of the back-scattering intensity to determine any signal extinction caused by the fog. The corrected altitude signal is then supplied to the missile guidance system as an input control signal for guiding the cruise missile to its target. One laser distance meter can alternatingly function as an altimeter and as a distance meter by switching its field of view back and forth between a perpendicularly downwardly looking position and an obliquely forwardly viewing position.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
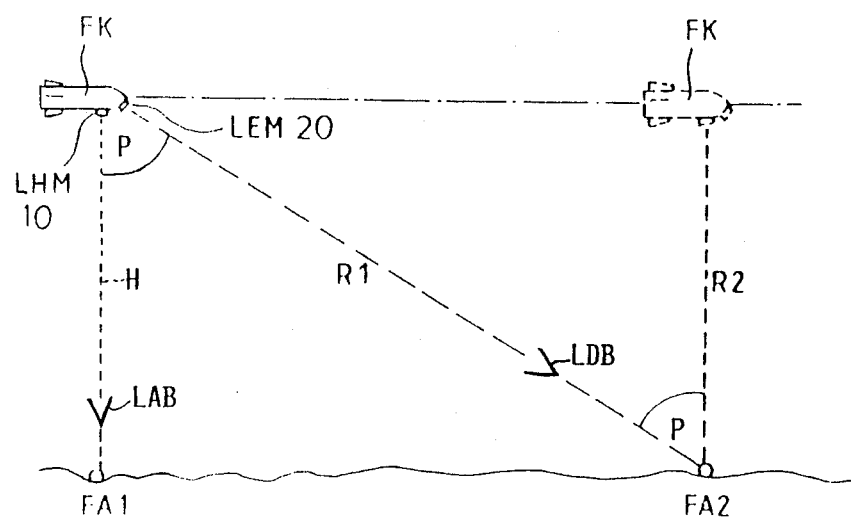
FIG. 1 is a schematic diagram of the functions of the vertically downwardly looking laser altimeter and the diagonally frontwardly viewing laser distance meter.

Referring to FIG. 1, it may be taken as a fact that, in the final phase, the missile FK flies over nearly uniform terrain T, for example, over flat land with woods and fields. In other words, the target area is not mountainous terrain with ravines and steep rises, which would foil maintaining the required altitude anyway. According to the invention, an on-board downwardly looking laser altimeter LHM 10 is combined with an on-board diagonally frontwardly viewing laser distance meter LEM 20 for a terrain-hugging cruise flight above the ground T at an altitude H. An electronic signal processor 30 shown in FIG. 2 receives signals from the vertically downwardly looking LHM 10 and from the forwardly viewing LEM 20 as will be described in more detail below. The LHM 10 emits laser beams LAB for measuring the distance R2 corresponding to the altitude H. The LEM 20 emits laser beams LDB for measuring the distance R1. These distances are measured between the missile FK and locations FA1, FA2.,.. on the ground T.

Figure 2:
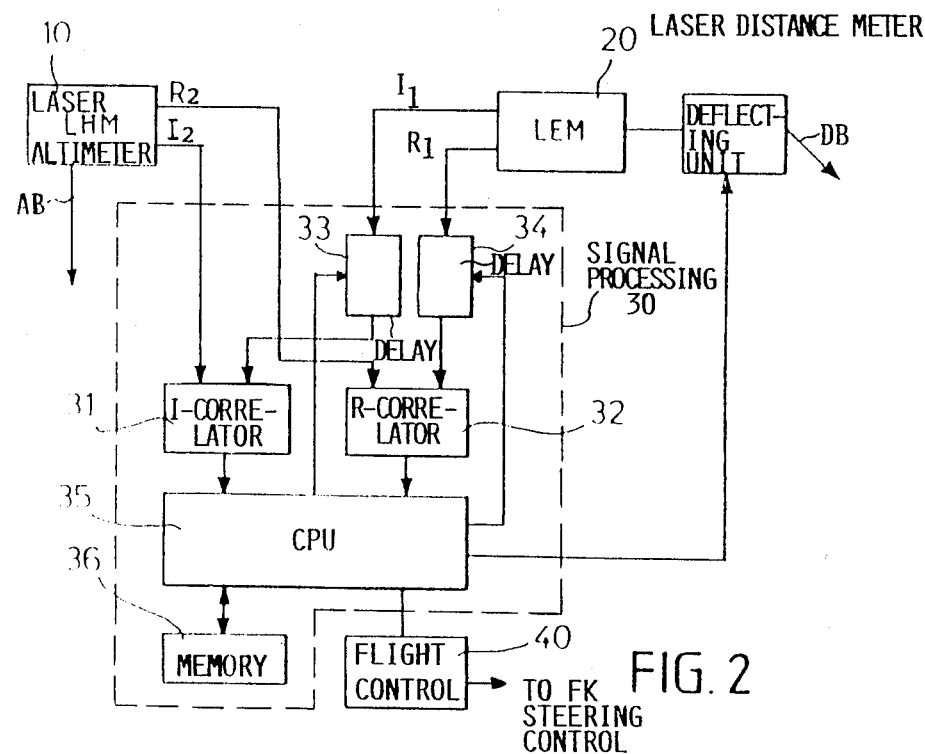
FIG. 2 shows a simplified block diagram of the measuring and signal processing electronic circuit.

The signal processor 30 correlates in time the measured signal values from both laser units 10 and 20 to determine the flying speed above ground and to provide a respective speed signal. The signal extinction caused by the fog is determined or calculated by comparing the intensities or amplitudes of the measured values relating to the same ground locations FA1, FA2,... and by taking the angular dependence of the back-scattering intensity from the angle $\rho$ into consideration to provide a correction signal which represents the fog extinction coefficient. The so produced correction signal is used to correct the altimeter reading and to provide a corrected flight control signal at the output of the flight control unit 40 shown in FIG. 2. The above principle of evaluating the measured signals from laser units LHM 10 and LEM 20 by the signal processor 30, is based on determining two unknowns, namely H the actual flight altitude, and $\alpha$, the fog extinction coefficient, by measuring or "interrogating" the ground twice under known, different angles $\rho$ to the vertical. Assuming constant equipment parameters, the foregoing approach is possible when the ratio of the back-scattering from the ground is known for both angles $\rho$. For this purpose both measurements should be taken with reference to the same ground location FA1, FA2,..., since in that case the ratio no longer depends on the back-scattering coefficients of the ground, but instead only on the angular distribution $L(\alpha)$ of the back-scattering. As a rule, the angular back-scattering distribution $L(\alpha)$ may be assumed to be adequately known, for example, it may be determined experimentally in an overall manner or individually for different topographies and stored in a memory 36 of the computer or central processing unit 35. In order to ensure that both measurements are taken relative to the same ground location FAZ the signals of both laser units 10 and 20, i.e. the distance intensities and the distance signals, are correlated continuously with each other by employing suitable time delay circuits 33 and 34 through which the signals from laser distance meter 20 pass. The delay $\Delta t$ corresponding to the correlation maximum from the comparison of the signals from meter 20 with the signals from altimeter 10, taken in conjunction with the distance between locations FA1 and FA2 also provides the flying speed. The respective flying speed signal is corrected as set forth above and used for controlling an inertial navigation system on board of the missile and for controlling the flight guidance. As shown in FIG. 2, the intensity signals $I_1$, $I_2$ and the distance signals R1, R2 from both units 10 and 20 are separately fed to a respective intensity correlator 31 and a respective distance value correlator 32. The delay units 33, 34 which are controlled by the computer or CPU 35, delay the signals from the laser distance meter 20 such that the correlators 31, 32 report the respective maximum correlation values to the computer 35. Such report takes place if the delay $\Delta t$ corresponds exactly to the flying time of the missile FK from location FA1 to location FA2.

When the fog is homogeneous, the receiving intensity of the unit 20 is a function of the distance R1, of the angular distribution $L(\rho)$ of the laser beam scattered in the location FA2, and of the fog extinction coefficient $\alpha$. If the missile FK has traveled from location FA1 to location FA2, then the receiving intensity of the vertically downwardly directed unit 10 will depend on the now smaller distance R2 and the angular distribution $L(0)$ of the laser beam scattered at the same location FA2. Assuming identical properties for the units 10 and 20 the ratio of both intensities is:

$$\frac{I_{(R1\ LEM)}}{I_{(R2\ LHM)}} = \left(\frac{R_2}{R_1}\right)^2 \cdot \frac{L(\rho)}{L(0)} \cdot \exp(-2\alpha(R_1 - R_2))$$

whereby $L(\rho)$ is the angular scattering distribution, i.e. the standardized back-scattering intensity with the back-scattering angle $\rho$ at location FA2. Using the known frontwardly viewing angle $\rho$ and the constant flying altitude H=R2, the computer 35 determines with $R_1 = R_2/\cos\rho$ the extinction coefficient $\alpha$. This coefficient is then used to correct the measured distance values R' which were falsified by the fog when the distance was measured according to the am/cw method. This correction can be done, for example, by measuring falsifications caused by the extinction coefficient for the occurring value range of $\alpha$ in preliminary tests and storing the data in form of an (R, R', $\alpha$) table in the memory 36 of the signal processor 30. Once the table is stored, the other operations are carried out continuously, i.e. for all ground locations flown over.

The procedure is analogous in the case when the missile flies over a layer of fog covering a distinct area, but having an upwardly decreasing density, for example, an artificial fog layer. It is suggested that, in addition to $\alpha$, the respective fog (artificial or natural) be characterized by an effective fog layer thickness or height N and that an (R, R', $\alpha$, N) table is established and stored in the memory 36. Since the measured receiving intensity is proportional to the magnitude "exp($-\alpha R$)/R2", the respective value of N can be adequately determined by measuring in more than two measuring directions, i.e. by changing the frontwardly directed viewing angle $\rho$.

Figure 4:
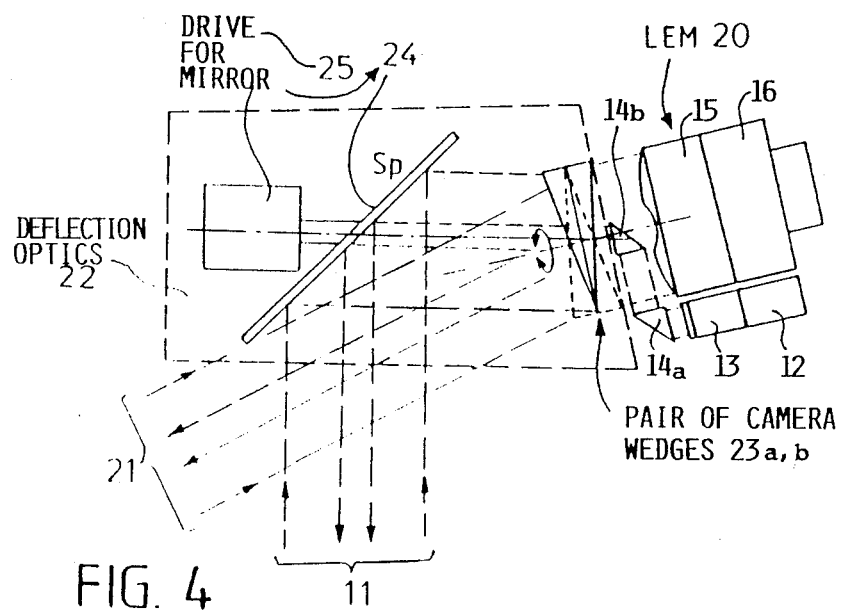
FIG. 4 is a schematic illustration of the laser distance meter with a deflecting mirror and counter-rotatable camera wedges for the beam deflection for a terrain-hugging flight wherein the altitude measurement and distance measurement are done by one unit.

Referring to FIG. 4, the foregoing operations can be performed in an advantageous manner by using only a single laser distance meter or unit 20, which also takes over the task of the laser altimeter 10 by changing in the laser distance meter 20 the measuring field of view periodically back and forth between the direction 11 perpendicularly to the ground and the direction 21 having an oblique slant relative to the forward direction or diagonally downwardly. Such an arrangement with a deflecting lens system 22 is shown in FIG. 4. Two camera wedges 23a, 23b, rotatable in opposite directions about the optical axis of the receiver optical means 15, 16, serve as a deflecting lens system 22 and move the measuring field of view 21 through a large enough angular range with a decreasing frontwardly directed viewing angle $\rho$ until the field of view falls on a deflecting mirror 24 and thus, deflects through an angular range to the vertical. This deflecting mirror 24 can be rotated by a drive 25 appropriately during curved flights of the missile FK so that the measuring field of view 11 for the altimeter function is rolled out, i.e. always views vertically downwardly. A coaxial arrangement of transmitter and receiver and a compact receiving lens system is recommended as a configuration for the units 10 and 20.

Figure 3:
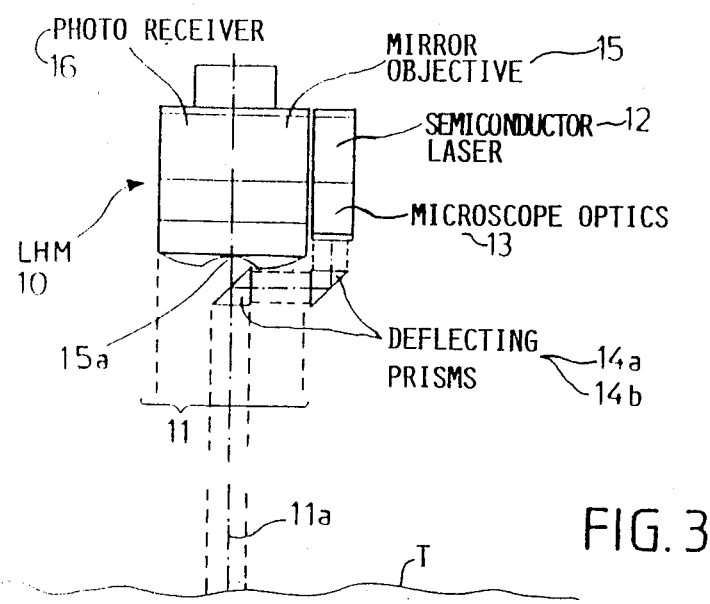
FIG. 3 is a schematic illustration of the vertically downwardly looking laser altimeter.

The FIGS. 3 and 4 show laser distance meters, wherein a semiconductor laser 12 projects the laser beam 11a into the center 15a of a light collector system or receiver optical means 15 by means of a microscope lens 13. The receiver system 15 is constructed as a so-called catadioptic system having a mirror lens telescope with a short structural length.

Since the measurements are continuously repeated due to periodic measuring in ranges of different angles $\rho$, the thus derived correction of the measured flying altitude is then sufficiently accurate even if the assumptions of constant parameters, as set forth above, no longer apply exactly. The accuracy of the correction can be further improved by including in the mathematical model otherwise known information, e.g. maps, about the terrain over which the missile FK is intended to fly or about the fog conditions, existing or to be expected, for example "if there is fog, assume it is artificial fog", for calculating the correction in the signal processor 30 and storing that information for this purpose in the memory 36. Particularly, optimal reliability of the fog recognition and elimination of its influence is achieved, for example, by having advance knowledge of the terrain to be covered and storing it in memory 36 of the computer 35 and having the signal processor 30 draw on this information to form a true measured value.

Although the invention has been described with reference to specific example embodiments, it will be appreciated, that it is intended to cover all modifications and equivalents within the scope of the appended claims.

What I claim is:

1. An apparatus for measuring distance and altitude for providing flight control signals to a cruise missile, comprising air-borne laser distance measuring means capable of downwardly looking for measuring altitude above ground and capable of obliquely and forwardly viewing for measuring distance at an oblique angle ($\rho$), said laser distance measuring means further comprising means for providing reception intensity signals and distance representing signals, central signal processing means connected to receive said intensity signals and said distance signals to perform a timed correlation in order to produce speed and altitude signals, said central signal processing means also comprising signal comparator means for comparing the intensities of said intensity signals derived from signals received from the same location or locations on the ground to form a correction signal which takes into account a back-scattering of laser radiation dependent on said oblique angle ($\rho$), said correction signal representing a signal extinction caused by fog on the ground, said central signal processing means also including computer means for calculating a corrected altitude value in response to said correction signal, said flight control signals including said corrected altitude value.

2. The apparatus of claim 1, wherein said central signal processing means comprise first signal correlator means (31) for correlating first intensity signals ($I_2$) with second intensity signals ($I_1$), and second signal correlator means (32) for correlating distance signals ($R_1$) with altitude signals ($R_2$), first signal delay means (33) arranged for passing said second intensity signals ($I_1$) to said first signal correlator means (31), second signal delay means (34) arranged for passing said distance signals ($R_1$) to said second signal correlator means (32), said first and second signal correlator means being connected to said computer means, said computer means being connected to said first and second signal delay means for controlling a signal ($\Delta t$) in such a way that said signal correlators correlate maximum signal values, whereby said computer means calculate a speed signal on the basis of said signal delay ($\Delta t$), said altitude signals ($R_2$), and said oblique angle ($\rho$).

3. The apparatus of claim 1, wherein said central signal processing means comprise memory means (36) connected to said computer means (35) for storing standard angle distribution of said back-scattering of laser radiation dependent on said oblique angle ($\rho$) and for storing experimentally determined angle distributions ($L(\rho)$) of said back-scattering for ground surfaces having different characteristics.

4. The apparatus of claim 3, further comprising a correction table stored in said memory (36), said correction table containing values for a signal extinction coefficient ($\alpha$) based on any assumption of a homogeneous fog on the ground, said memory further holding and corrected distance values ($R_2$) correlatable to actually measured distance values ($R\frac{1}{2}$) for supplying said corrected distance values to guidance means of said cruise missile.

5. The apparatus of claim 1, wherein said laser distance measuring means comprise means for adjusting said oblique angle ($\rho$) so that said laser distance measuring means can view obliquely forwardly and downwardly at different oblique angles ($\rho$), and wherein said computer means calculates, in addition to said signal extinction, an effective layer thickness (N) of said fog.

6. The apparatus of claim 1, wherein said central signal processing means comprise memory means (36) connected to said computer means (35), and wherein a correction table stored in said memory means contains values for a signal extinction coefficient (α), values for an effective layer thickness (N) of said fog, and corrected distance values ($R_2$) correlated to said signal extinction coefficient (α), to said layer thickness, and to actually measured distance values ($R_1$).

7. The apparatus of claim 1, wherein said central signal processing means comprise memory means (36) connected to said computer means for storing guidance relevant information regarding the terrain over which said missile is flying, or regarding any fog on the ground or to be expected, said computer means being capable of performing a correction program which takes into account said guidance relevant information.

8. The apparatus of claim 1, wherein said laser distance measuring means comprise a downwardly looking laser altimeter for measuring altitude above ground, and an obliquely forwardly looking laser distance meter for measuring distance to points on the ground at said oblique angle. (ρ).

9. The apparatus of claim 8, wherein each of said downwardly looking laser altimeter and said laser distance meter comprises receiver optical means (16) including a mirror lens telescope (15) having a short structural length, a semiconductor laser (12), a microscope objective (13), and deflecting means (14a, 14b) for projecting a laser beam from said semiconductor laser (12) into an optical center (15a) of said receiver optical means.

10. The apparatus of claim 1, wherein said laser distance measuring means comprise a single laser distance meter for measuring altitude and for measuring distance at said oblique angle (ρ) to ground, said laser distance meter comprising optical deflection means (22) and drive means (25) for adjusting the position of said optical deflection means (22) to periodically change a viewing direction of said laser distance meter from a perpendicularly downwardly looking direction to an obliquely forwardly viewing direction and vice versa, whereby said laser distance meter functions as an altimeter when looking vertically downwardly and as a distance meter when viewing forwardly.

11. The apparatus of claim 10, wherein said optical deflection means (22) comprise two camera wedges (23a, 23b) forming a pair, said camera wedges being mounted for counter-rotating relative to each other, and a deflection mirror (24) driven by said drive means (25) responsive to a curved flight of said missible for keeping said downwardly looking direction perpendicular to the ground even during said curved flight.

12. The apparatus of claim 11, wherein said drive means (25) drive said deflection mirror (24) and said camera wedges (23a, 23b).

* * * * *